Jan. 18, 1966  H. K. CYMARA  3,229,664
DOUBLE DROP BARN CLEANER
Filed Oct. 6, 1964  2 Sheets-Sheet 1

*INVENTOR*
HERMANN K. CYMARA.

BY

ATTORNEY

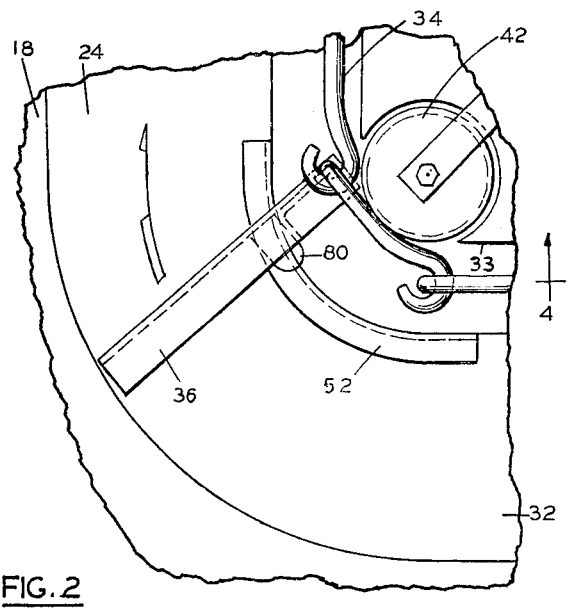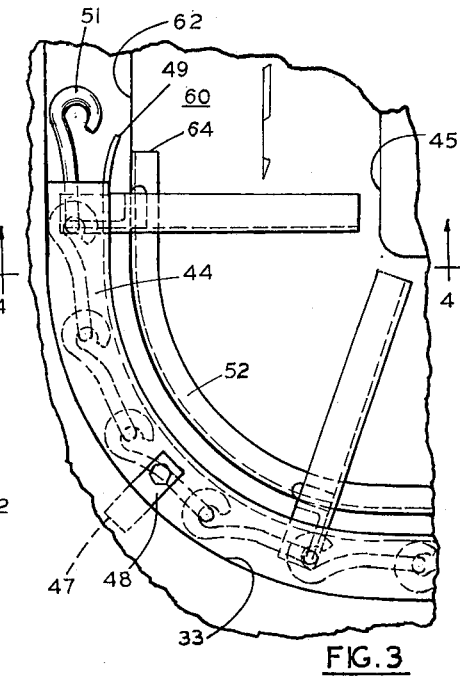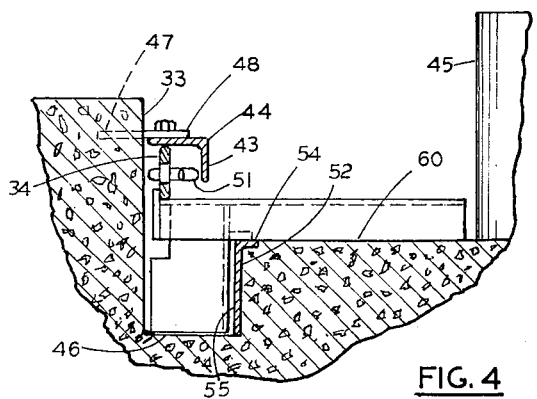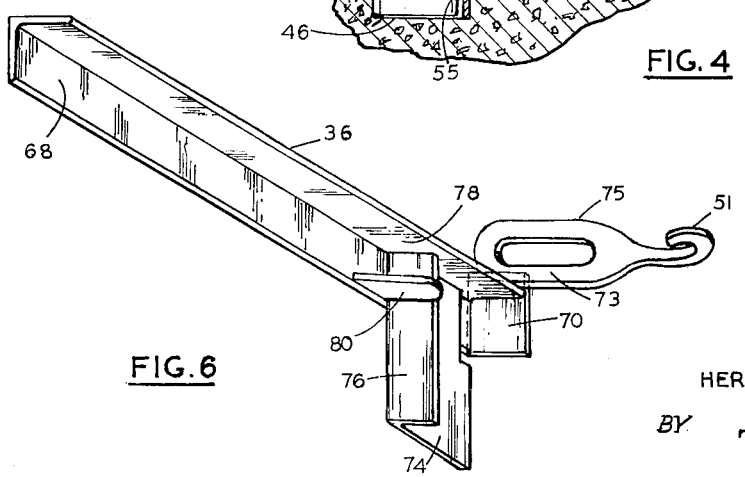

3,229,664
DOUBLE DROP BARN CLEANER
Hermann K. Cymara, R.D. 2, Newfield, N.Y.
Filed Oct. 6, 1964, Ser. No. 401,917
1 Claim. (Cl. 119—28)

This invention relates to barn cleaners of the type employing a collecting trough and endless chain actuated scavenging mechanism.

In barns, particularly employed for herds of dairy cattle where the utmost sanitation is desirable, it has been the practice to provide channels in the floor for catching animal waste and litter, and provide means for clearing the channel from time to time. The channels or gutters have flat bottoms, and are disposed, in reference to a line of cows stanchioned so as to directly receive the animal waste, or excrement in the form of fluids and semisolids. Such troughs, between periodic cleaning, become partly filled with unsanitary fluids, and happen to be disposed so as to be aligned, with the tails of the animals when reclining. Such animals appear inclined to favor a tail soaked with the fluids in the gutter, and with constant switching of the tails, there is created an unwholesome atmosphere and spreading of waste.

The present invention is directed to the employment of a double drop channel or gutter, to effect the gravity separation of the fluids from the main channel, the channel having an L cross-section, and including a narrow channel of greater depth to receive the fluids. The narrow channel is disposed in such a manner as to be guarded by the scavenging mechanism, whereby the animal tails are prevented from falling into the narrow channel, and becoming saturated with the unsanitary fluids. The invention further has to do with mechanism constructed to sweep or scavenge the irregular sectional channel with effectiveness, whereby the animal waste, both fluids and solids, may be removed therefrom from time to time, by power acting to propel the waste along the channel to an end position for discharge outside the barn.

The above and other novel features of the invention will appear more fully hereinafter from the following detained description when taken in conjunction with the accompanying drawings. It is expressly understood that the drawings are employed for purposes of illustration only and are not designed as a definition of the limits of the invention, reference being had for this purpose to the appended claim.

In the drawings, wherein like reference characters indicate like parts:

FIGURE 2 is an enlarged fragmentary plan view of the double drop channel in the region of an inside turn with respect to the second channel drop;

FIGURE 3 is an enlarged fragmentary plan view of the double drop channel in the region of an outside turn with respect to the second channel drop;

FIGURE 4 is a sectional view taken substantially on the line 4—4 of FIGURE 3;

FIGURE 6 is a perspective view from beneath of such a blade showing the rear face.

Figure 1:
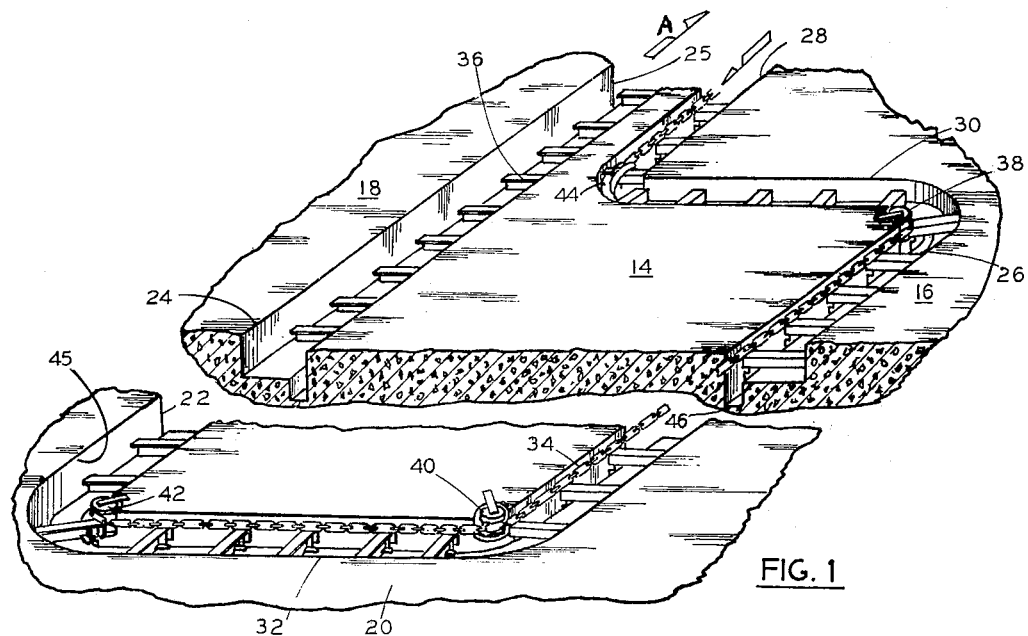
FIGURE 1 is a schematic perspective view of a barn floor provided with a double drop channel and equipped with the apparatus for scavenging.
Figure 5:
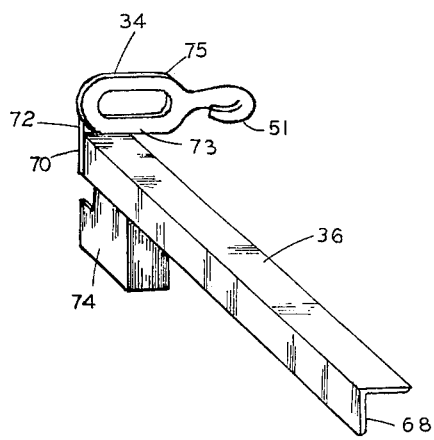
FIGURE 5 is a perspective view from above of a sweeper blade and chain link, showing the front face.

Referring to FIGURE 1 of the drawings, there is shown the floor 20 of a cow barn as used for a dairy herd. The floor is provided with a continuous trough loop 22 of uniform cross section having spaced parallel portions 24 and 26, each of a length to accommodate a row of dairy cows, stanchioned at right angles thereto. It will be understood, that the row of cows stanchioned in respect to trough portion 24, will be disposed to the left thereof or on the floor area 18, with their hind quarters disposed immediately adjacent to the trough portion 24, and the row of cows stanchioned in respect to trough portion 26, will be disposed similarly to the right thereof or on the floor area 16, and facing oppositely. The trough, as shown has an entry portion 28, a short lateral portion 30, connecting with the portion 26, and a lateral portion 32 connecting the ends of the trough 26 and 24 to complete the continuous through loop.

Such troughs have, in the past, been of substantially rectangular cross section, and of a width of about 12 to 14 inches, and a depth in the order of 10 to 12 inches, below the surface of areas 16 and 18, the center area 14 usually being several inches lower than the surface of areas 16 and 18. In order to clear such troughs of animal waste, that is excrement, both fluids and solids, straw and the like, a heavy endless chain, hugging the inside wall of the trough, having scraper blades disposed at right angles and affixed to links of the chain at frequent intervals, has been employed. Thus by applying power to pull the chain in the direction of arrow A, the trough scavenged, and the waste delivered to a discharge point (now shown) disposed beyond the open end 25 of trough portion 24.

Such troughs or gutters collect urinary fluids from the cows, and since the scavenging operation is operated usually once a day, the trough constitutes an open waste canal, immediately to the rear of the animal stanchions, into which the tails of the animals, when reclining naturally fall. The constant switching of tails, soaked with the fluid in the trough results in an unwholesome atmosphere.

In order to obviate the condition described, the trough of the present invention is provided with a narrow secondary or deeper trough along the inside wall thereof to provide in effect a double drop. Such secondary trough or channel is of uniform section and may have a width of about 3 inches, and may extend to a depth of about 4 inches below the depth of the shallow trough or first drop. By such means, space is provided at a lower level for fluids to drain into. Such secondary trough or channel is of a size adequate to accommodate the fluids occurring between successive scavenging operations. Such second drop is sufficiently narrow so as to be guarded by the scraper blades which are spaced a foot or so apart, as well as by the chain which has a lateral width approaching two inches. Thus means are provided to prevent the animal tails from entry into the second drop. By supplying each scraper blade with a depending paddle of suitable shape to scavenge the secondary trough, the L-sectioned trough is as readily scavenged, as the shallow rectangular trough heretofore employed.

Referring again to FIGURE 1 of the drawing there will be seen a heavy chain 34 to which, at fixed intervals such as every fourth link, is attached scraper bars 36. The chain rides around rollers 38 and 40 and 42, on inside turns between the straight trough portions 30 and 26, 26 and 32, and 32 and 24, and rides within an arcuate angle sectioned guide 44 on the outside turn between the trough portions 28 and 30.

As shown in FIGURES 2, 3 and 4, the double drop trough and particularly the secondary trough or channel 46, is disposed below the chain 34. Such double drop trough extends the entire length of the loop 20. The L-shaped trough is preferably formed in a concrete floor of the barn. At the turns, a side face of the narrow channel or second drop is provided with an angle iron wear plate, 52 having a horizontal flange 54 and depending skirt 55, such plate, with its flange and skirt being set into the concrete so that the exposed surfaces of the wear plate, at their opposite ends are flush with the bed surface 60 of the upper trough 45, and the channel wall 62, as at 64.

The angle iron guide 44 is supported from the ends of two or more arms 48, rooted in the concrete as at 47. The depending flange 43 of the angle iron guard, may be extended and flared as at 49 to guide the hook portions 51 of the chain links into the guide. Thus at all points along the channel 20, the chain 34 is caused to hug the inside wall 33 of the channel.

Each of the scraper blades 36 comprises a horizontally disposed angle iron sweep portion 68. At one end of the sweep portion is affixed, as by welding, an end plate 70. Such end plate projects above the sweep sufficiently to provide a heavy tab 72 to which one side 73 of the loop of a heavy chain link 75 is welded. Affixed to the inside surface of the vertical portion of the sweep is a plate or paddle 74, which depends below the sweep a distance commensurate with the depth of the channel 46, less slight clearance. Such plate is of a width about a half inch less than the width of the second drop and is provided with a side flange 76, which may act as a stiffener, and the upper end of which may abut the underside of the horizontal portion 78 of the angle iron sweep.

A shoe 80 adapted to ride along the edge of the upper channel and on the flange 54 of the wear plates 52, extends rearwardly from the lower edge of the sweep and is disposed against the flange 76. Each sweep is provided with a shoe. The angle iron, its end plate and chain link, paddle and shoe comprises a rigid L-shaped scavenger blade or sweep, and one such unit will be interposed at every fourth or fifth link in the chain, or at such intervals as desired.

It will be seen from the above, that the second drop is of sufficient capacity to receive all excess fluids, at a level below the chain and blades. The heavy chain and blades act as a guard to prevent the animals from dipping their tails into the secondary trough. It will be understood that the angle iron wear plate 52 provided at the turns may be extended the entire length of the trough if desired. It will also appear that by the provision of the second drop channel, the semi-solid waste matter in the upper channel will not become diluted by waste fluids, and thus will not readily be affected by contact with the tails of the animals. Such semi-solid waste becomes somewhat covered by straw shoved into the trough and hence remains in a semi-dry protected state in the channel, until the sweeper bars remove it by power actuation of the chain. It will also be seen that the sweeper bars present a relatively smooth forward face such that the same are readily scraped clear, as by a scraper or wire brush as each arrives at the discharge area of the apparatus.

In practice, the endless chain will pass around a power driven drive sprocket (not shown), and will be provided with necessary means to maintain the degree of tautness desirable for the effective actuation of the sweepers. Any configuration of the channel may be employed, to suit the requirements of any particular barn, it being understood that the cross-section of the double drop channel will be uniform from end to end of the channel.

While a single form of the invention has been illustrated and described, it is to be understood that the invention is not limited thereto. As various changes in the construction and arrangement may be made without departing from the spirit of the invention, as will be apparent to those skilled in the art, reference will be had to the appended claim for a definition of the limits of the invention.

What is claimed is:

A cattle barn floor having a floor area for cattle stanchioned in a row, a trough loop formed in the floor having a straight section along one side of said area and adapted to receive animal waste, said trough being of substantially uniform L shaped cross section throughout its length, and comprising a relatively wide flat bottom upper channel portion, and a narrow deeper channel disposed along the side of the trough remote from said area, an endless link chain disposed in the trough above said narrow channel and adjacent to said side of the trough, and a plurality of sweeper bars crosswise of the trough affixed at one end to spaced links of said chain, said sweeper bars having a depending paddle affixed thereto and extending into said narrow deeper channel, said loop including a curved arcuate section constituting a ninety degree bend leading into said straight section, said curved section having a curved angle iron wear plate having a flange flush with the bottom of said upper channel portion, and a curved arcuate skirt flush with the other side of said deeper channel, and said sweeper bars each having a shoe extending rearwardly of the lower edge thereof and disposed adjacent said paddle, and adapted to ride on said flange, and a pulley for said chain mounted on a vertical axis concentric to said wear plate skirt, in a recess in said floor, the periphery of said pulley being substantially tangential to said remote side of the trough.

References Cited by the Examiner

UNITED STATES PATENTS 2,768,734   10/1956   Klinzing _____ 198—229

FOREIGN PATENTS 937,038   12/1935   Germany.

SAMUEL KOREN, *Primary Examiner.*

HUGH R. CHAMBLEE, *Examiner.*